Oct. 28, 1930.　　　　J. MAURER　　　　1,779,850
PROCESS FOR COATING WITH METAL, PORCELAIN,
CELLULOID, ETC., IN A PLASTIC STATE
Filed June 17, 1926　　　2 Sheets-Sheet 2
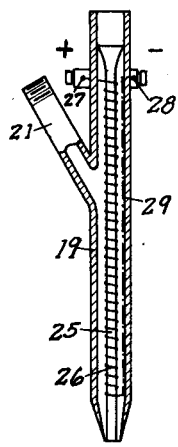
FIG. II
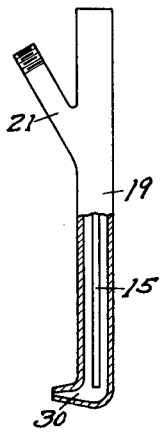
FIG. III
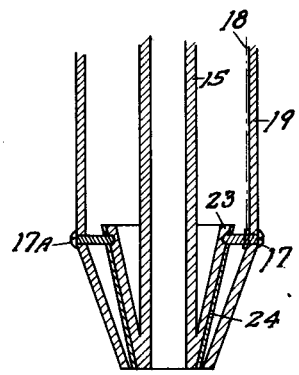
FIG. IV
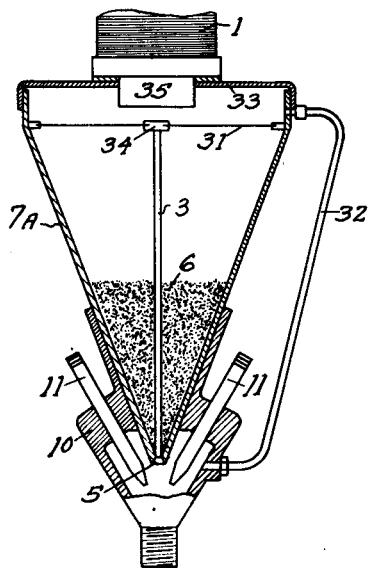
FIG. V
INVENTOR
Jakob Maurer,
BY
ATTORNEY Patented Oct. 28, 1930

1,779,850

UNITED STATES PATENT OFFICE

JAKOB MAURER, OF CONSTANCE, SWITZERLAND

PROCESS FOR COATING WITH METAL, PORCELAIN, CELLULOID, ETC., IN A PLASTIC STATE

Application filed June 17, 1926, Serial No. 116,539, and in Germany June 19, 1925.

The invention relates to a process for covering or filling natural or artificial teeth with materials well known in dentistry in such a way that structures are formed which hitherto could be formed only by means of the processes of plugging, casting, punching and soldering.

The new process consists in transforming the materials serving for the treatment of teeth into a doughy plastic state and then in propelling or spraying them on to the place to be treated by means of the well known spraying process. The material adheres to the walls of the tooth or to the particles of the material already sprayed upon them. In this way it is possible to produce coatings of metal, porcelain, celluloid or the like and to form structures of the said materials on the teeth, the structures being of any form whatever.

A spraying contrivance serves for the execution of my process. This spraying contrivance differs from the well known spraying contrivances used hitherto for coating with finely distributed metals by having provisions for two separate air currents. The weaker of the latter serves for carrying the material to be sprayed through the spraying contrivance where the material is heated. This heated mixture of air and material passes onward and is met in the discharge end of the apparatus by a stronger current of air which picks it up and projects it on to the point of application. In this way both are cooled down to such an extent that on reaching the place of application the mixture does not contain sufficient heat to cause destruction of the surfaces treated or to cause pain to the patient. By varying the two air currents the exit temperature of the air mixture can be regulated very accurately.

As the distance from the nozzle of the spraying contrivance to the place to be treated is only a very small one the cooled particles consisting of metal, porcelain, or the like have no time to crystallize out before they strike the place to be treated. Thus the particles are projected on the surface to be treated in a doughy paste-like condition and form a coherent solid coat or filling.

A special applicator is provided as it is necessary in my new process to measure accurately the finely divided materials to be introduced into the carrying air current. This applicator has as its special characteristic a vibrating feed device.

The heating of the material to be sprayed takes place as already mentioned while passing through the spraying contrivance. For this purpose the latter is constructed in the form of an electrical resistance heating tube or as a high frequency induction tube. The induction type of heating tube is only applicable in the apparatus when the material to be sprayed is a metal. It has however the advantage that the transporting air is not appreciably warmed. The compressed air used for the final spray and cooling need therefore cool only the material being deposited.

The preferred form of my invention is illustrated in the accompanying drawings in which Fig. 1 is a schematic view of the appliance shown partly in section.

Fig. 2 illustrates the form of apparatus in which the heating is effected by means of a high frequency induction tube.

Fig. 3 is a modified form in which the nozzle piece has a right angle bend.

Fig. 4 is an enlarged illustration of the nozzle orifice of Fig. 1.

Fig. 5 is a further modification of the applicator shown in Fig. 1.

Figure 1:
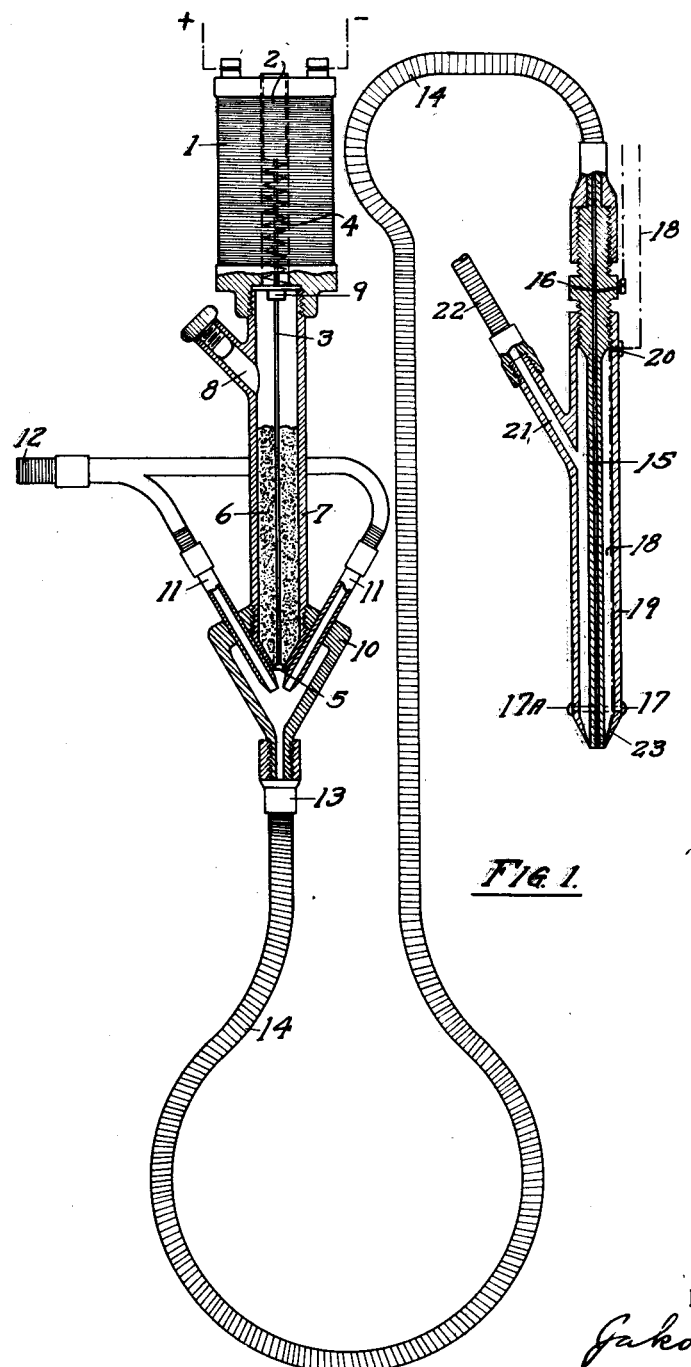

1 is a solenoid coil having a slidable iron core 2 in the lower end of which is attached a brass rod 3. This core 2 is forced upward by the action of spring 4, so that the cone valve at the lower end of rod 3 is drawn on to its seat and closes the lower end of shell 7 containing the powdered material 6. If an electric current is passed through the coil 1 its action on the core 2 causes it to be drawn downward thus opening the valve 5 by the action of the rod 3. I have found it advantageous to utilize an alternating current in this coil to produce a vibrating action on the rod 3 and valve 5. By properly regulating this current a reliable feed action through the valve 5 is secured. Shell 7 is provided at one side with a charging socket 8 capable of being closed and also at its upper end with a stuffing box 9 which prevents material 6 from leaving the shell at the top in spite of the rod 3 moving to and fro.

The finely divided material dropping from the feed device 1—9 enters a chamber 10 which advantageously has the shape of a cone and into which a gaseous means for exerting pressure is introduced through nozzles 11 from a pressure supply 12. In addition to air, nitrogen, carbonic acid and the like may be used. The compressed gas passing through nozzles 11 takes along the finely divided material 6 and forces it into a pliable tube 14 attached to the socket 13. The other end of the tube 14 is joined to the spraying contrivance proper; the latter consists of the inner tube 15 through which the compressed gas taking along the finely divided material passes and which according to the example shown in Fig. 1 is a resistance heating tube. For heating this tube a current is introduced into the metallic conducting tube 15 by means of contact 16. After having passed the tube lengthwise the current leaves by contact 17 and is conducted back through cable 18 inside tube 19 to junction 20.

Tube 19 coaxially surrounding the heating tube 15 contains the socket 21 which is joined to a compressed air supply 22. The latter supplies the compressed gas necessary for propelling the finely divided material leaving the spraying device. Care has to be taken that the gas currents coming from tubes 12 and 22 do not join before they have left the orifice of the spraying device.

It is important that the combination of these currents does not take place previously in order that the material heated in tube 15 shall not cool down prematurely. In order that the premature cooling down may be prevented with absolute certainty it is essential that the lower part of tube 15 should be warmed particularly well because especially strong cooling is observed just at the orifice in consequence of the nozzle-like narrowing of tube 19 (see Fig. 4). According to my invention a hood 23 which has the shape of a cone is fixed to the lower end of tube 15 in order that this special cooling effect may be counteracted. At the top end of the latter the electrical heating current enters or leaves at 17 so that tube 15 is surrounded by the heated hood 23 which is joined to it metallically. Hood 23 is provided with an insulating layer 24 to minimize the undesirable exchange of heat between the compressed gas passing through tube 15 and the air current for projecting the material which is conducted through tube 19. It may be mentioned that the screws 17 and 17$^a$ serve for connecting up the current as well as for centering the tube 15 in tube 19.

The form of spraying device according to the example illustrated in Fig. 2 differs from the one just described in that the supply tube 25 (in contradistinction to supply tube 15) consists of non-conducting material and is provided with a high frequency induction coil 26. The current is introduced at 27 and leaves at contact 28 to which is attached the cable which is conducted back inside tube 19. By this arrangement the material which is charged through tube 25 in the above described manner is, in the case of it being of a metallic nature, heated to the desired temperature in consequence of the induction action whilst the compressed gas is only slightly warmed. As tube 25 does not generate any radiant heat this offers the further advantage that a preheating of a gas supplied through tube 22 is avoided.

The spraying device illustrated in Fig. 3 differs from those already described by the fact that the tube 15 or 25 conducting the material leads into a more or less rectangularly bent head 30. By this form the treatment of the back sides of teeth is made possible in the way generally used with drills by means of angle pieces. Thus the strong air current used for propelling the material prevents the adhering to the walls of head 30 of the small parts of the material. The gas or air currents leaving tubes 15 or 25 and 19 can be regulated either by altering the gas pressure and consequently the quantity of air or by altering the cross-section of the exit in the nozzle. For this purpose tube 15 (25) may be movably arranged inside tube 19.

The applicator illustrated in Fig. 5 has in the place of the stuffing box 9 of the diaphragm 31 which participates in the to and fro movement of rod 3, the diaphragm replacing spring 4 at the same time. Here rod 3 need not protrude from the container 7$^a$. It is sufficient if it is fixed to diaphragm 31. The latter has a metallic button 34 which is magnetically acted upon by the core 2 which in this case is fixed in the coil 1. In order to obtain a reliable swinging of the diaphragm 31 when acted upon by magnet 35 it is advantageous to provide for a tube 32 which compensates the pressure; this tube 32 connects chamber 10 with chamber 33 the latter being arranged above diaphragm 31.

Although it is preferable to apply the finely divided material in the form of a powder the process according to my invention can also be carried into effect by using the material in the shape of wire the latter being divided into fine particles which then are carried along by the compressed gas.

My invention works as follows:

By means of a foot rheostat contact a current is passed through the coil 1 and regulated. This causes a vibratory movement in the core 2 which is transmitted to the valve 5 and makes the material particles fall into chamber 10 from the container 7 or 7$^a$, arranged above, which is thus alternately opened and closed. The compressed gas entering chamber 10 under pressure can only act in the direction of the flexible tube 14 because the container 7 or 7ª respectively is tightly closed at its top by stuffing box 9 or diaphragm 31. An escape of the finely divided material 6 therefore is not possible even if container 7, 7ª is not opened. The particles of the material are fed by means of the compressed gas through flexible tube 14 into the interior of tube 15. Here the material 6 is heated to the temperature necessary to transform the particles of the material into a doughy paste-like state. Tube 15 is heated as described above either by constructing it as a resistance heating tube or by surrounding tube 25 consisting of a non-conducting material with an induction coil 26, the passing metallic particles being heated by means of induction. The compressed air introduced through socket 21 into the spraying device passes through tube 19 in relatively large quantity and with relatively great speed. Care has to be taken that this air intended for projecting the finely divided material leaving tube 15 is not heated prematurely. The material to be projected unites with the heated compressed gas for projecting at the place where they leave the nozzle, or, according to another way of carrying out the invention illustrated in Fig. 3, immediately before leaving. The compressed gas as well as the heated finely divided material which is carried along is thereby cooled down to such an extent that no injury results from any heat still present. The small particles of the material however are, on striking the place to be worked upon still in a plastic doughy condition; they therefore stick closely together in consequence of the energy of the projection so that a coherent coating is produced or, if the projection is continued for some time, a solid body of a desired shape is formed.

According to my new process I am enabled to treat not only natural or artificial teeth but also such artificial structures as crown work, bridges and the like, which can not be removed from the mouth without difficulty in order to repair or supplement them.

What I claim is:

A process for the application of dental fillings, coatings and the like, comprising the step of reducing finely divided material to a plastic state by means of heat, and then removing excess heat from the material by means of a cool air blast immediately preceding the moment of contact of the material with the surface to be treated.

Signed at Frankfort-on-the-Main, Germany, this 1st day of June, A. D. 1926.

JAKOB MAURER.